United States Patent
Pedron

(10) Patent No.: US 10,562,777 B2
(45) Date of Patent: Feb. 18, 2020

(54) PROCESS AND APPARATUS FOR PRODUCTION OF GRANULAR POLYCRYSTALLINE SILICON

(71) Applicant: Wacker Chemie AG, Munich (DE)

(72) Inventor: Simon Pedron, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 16/078,262

(22) PCT Filed: Feb. 23, 2017

(86) PCT No.: PCT/EP2017/054177
§ 371 (c)(1),
(2) Date: Aug. 21, 2018

(87) PCT Pub. No.: WO2017/144591
PCT Pub. Date: Aug. 31, 2017

(65) Prior Publication Data
US 2019/0055130 A1    Feb. 21, 2019

(30) Foreign Application Priority Data

Feb. 25, 2016  (DE) .......... 10 2016 202 991

(51) Int. Cl.
*C01B 33/03* (2006.01)
*B01J 8/18* (2006.01)
*B01J 19/02* (2006.01)

(52) U.S. Cl.
CPC ............ *C01B 33/03* (2013.01); *B01J 8/1827* (2013.01); *B01J 8/1836* (2013.01); *B01J 8/1872* (2013.01);
(Continued)

(58) Field of Classification Search
CPC ..... B01J 19/02; B01J 19/00; B01J 8/02; B01J 8/06; B01J 8/067; B01J 8/22; B01J 8/24;
(Continued)

(56) References Cited

U.S. PATENT DOCUMENTS 4,786,477 A    11/1988  Yoon et al.
4,868,013 A    9/1989   Allen
(Continued)

FOREIGN PATENT DOCUMENTS

CN    203295205 U    11/2013
WO    9641036 A2     12/1996
(Continued)

*Primary Examiner* — Melvin C. Mayes
*Assistant Examiner* — Smita S Patel
(74) *Attorney, Agent, or Firm* — Brooks Kushman P.C.

(57) ABSTRACT

Prolonged operation campaigns in a fluidized bed reactor for producing granular polysilicon by deposition of silicon onto silicon seed particles from a silicon-containing precursor gas is made possible by employing a silicon-coated reaction tube which is not insulated above a region of the fluidized bed and as a result has a lower temperature such that the ratio of the thickness of the silicon on the reactor tube adjoining the fluidized bed to the coating thickness over the total reactor tube is from 7:1 to 1.5 to 1 after production campaign of from 15 to 500 days.

4 Claims, 3 Drawing Sheets

Arrangement as used in ex. 1

(52) U.S. Cl.
CPC ...... *B01J 19/02* (2013.01); *B01J 2208/00168* (2013.01); *B01J 2208/00495* (2013.01); *B01J 2219/0213* (2013.01)

(58) Field of Classification Search
CPC ...... B01J 8/1827; B01J 8/1872; B01J 8/1836; B01J 8/18; B01J 2208/00495; B01J 2208/00477; B01J 2208/0176; B01J 2208/00168; C01B 33/03
See application file for complete search history.

(56) References Cited

U.S. PATENT DOCUMENTS

| | | |
|---|---|---|
| 4,900,411 A | 2/1990 | Poong et al. |
| 2002/0081250 A1 | 6/2002 | Lord |
| 2002/0102850 A1 | 8/2002 | Kim et al. |
| 2016/0067665 A1 | 3/2016 | Jiang et al. |
| 2017/0158516 A1* | 6/2017 | Pedron .................. C01B 33/027 |

FOREIGN PATENT DOCUMENTS

| | | |
|---|---|---|
| WO | 2007145474 A1 | 12/2007 |
| WO | 2015197498 A1 | 12/2015 |
| WO | WO-2015197498 A1 * | 12/2015 |

* cited by examiner

Fig. 1 Reactor according to the prior art
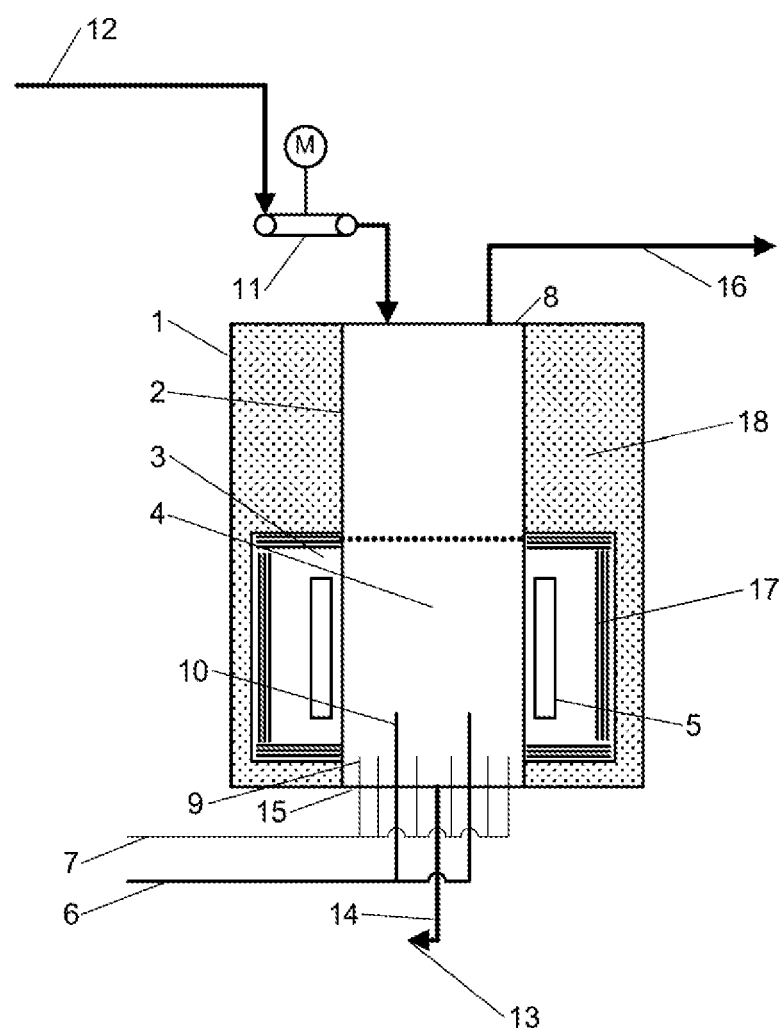

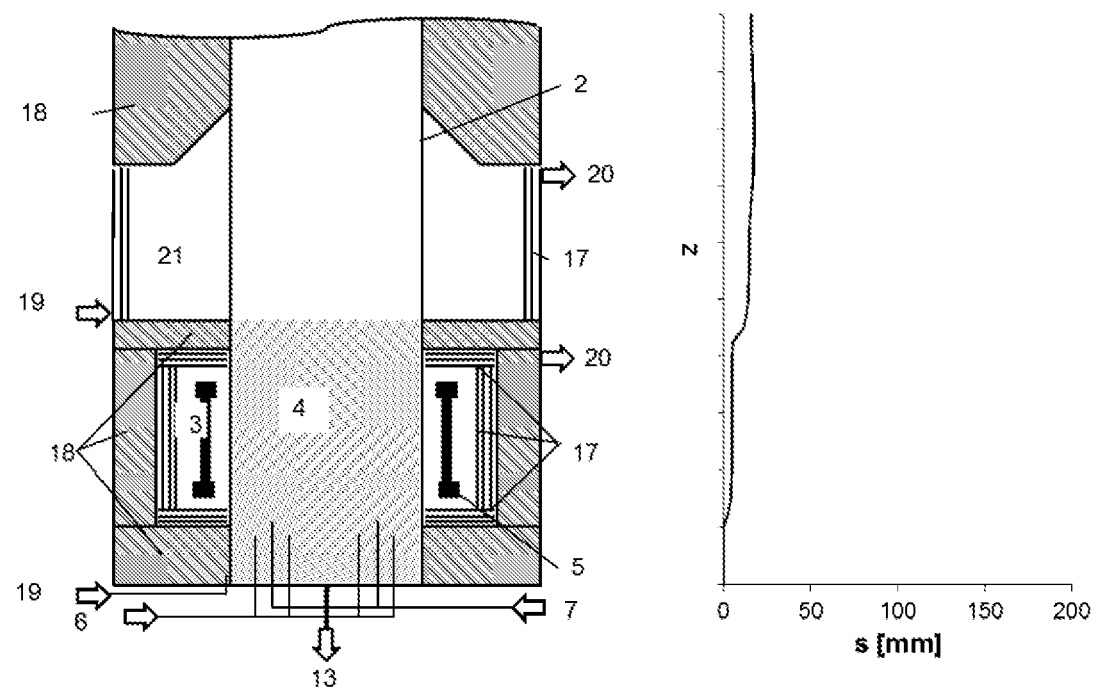
Fig. 2: Arrangement as used in ex. 1

Fig. 3: Arrangement as used in comparative example
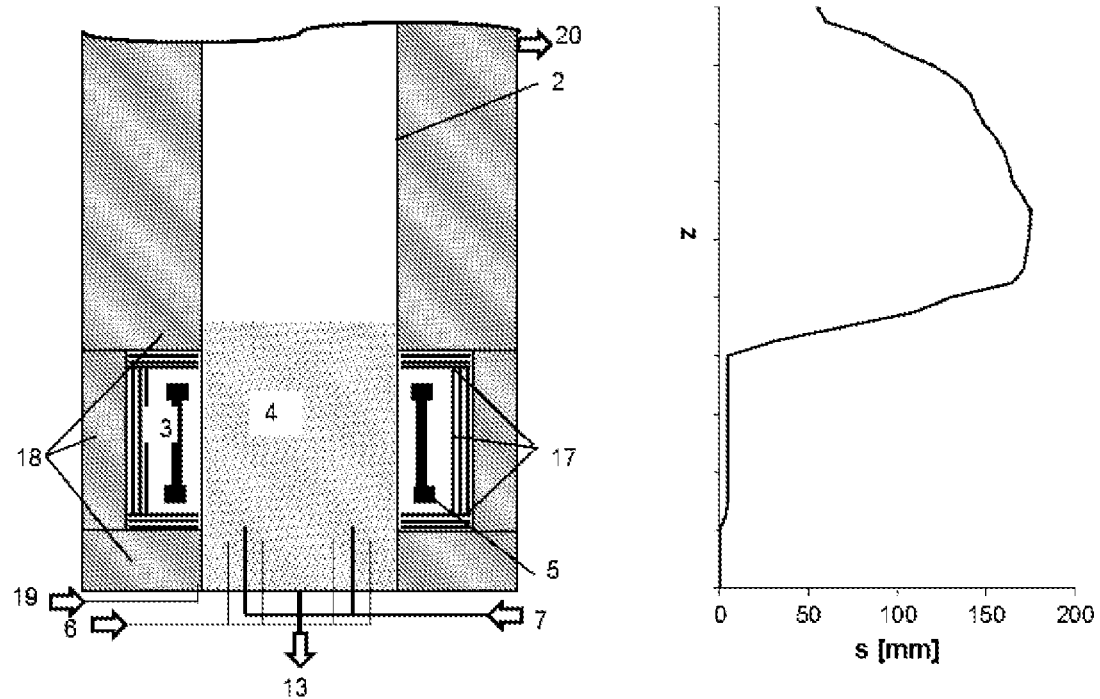

PROCESS AND APPARATUS FOR PRODUCTION OF GRANULAR POLYCRYSTALLINE SILICON

CROSS REFERENCE TO RELATED APPLICATIONS

This application is the U.S. National Phase of PCT Appln. No. PCT/EP2017/054177 filed Feb. 23, 2017, which claims priority to German Application No. 10 2016 202 991.6 filed Feb. 25, 2016, the disclosures of which are incorporated in their entirety by reference herein.

BACKGROUND OF THE INVENTION

1. Field of the Invention

The invention relates to a process and an apparatus for producing granular polycrystalline silicon in a fluidized-bed reactor.

2. Description of the Related Art

Granular polycrystalline silicon is produced by fluidization of silicon particles by means of a gas stream in the reactor tube of a fluidized-bed reactor, with the fluidized bed being heated to a high temperature by means of a heating device. Addition of a silicon-containing reaction gas results in a pyrolysis reaction on the hot particles surfaces. Elemental silicon is deposited on the silicon particles and the diameter of the individual particles grows. The process can be operated continuously with all the advantages associated therewith by regularly taking off grown particles and adding smaller silicon particles as nucleus particles (seed). Such deposition processes and apparatuses for this purpose are, for example, known from U.S. Pat. No. 4,786,477A.

In practice, however, deposition of silicon occurs on the hot reactor parts, e.g. the interior wall of the reactor tube, leading to heat buildup and thus thermomechanical stressing of the reactor tube through to mechanical failure or melting of the deposit on the wall when the deposit on the wall reaches a certain thickness. Furthermore, seed can get from above into the fluidized bed only to a limited extent due to the constriction of the flow cross section by the deposit on the wall. Reactor failures are the result. Minimizing the problem of silicon deposition on the hot reactor surfaces is of critical importance for economical operation of the fluidized-bed process.

US20020102850A1 discloses a method of avoiding or removing silicon deposits on feed gas nozzles by continuous, discontinuous or regulated introduction of HCl+inert gas (H$_2$, N$_2$, He, Ar) or inert gas H$_2$.

U.S. Pat. No. 4,868,013 (Allen) describes a process in which the surface of the reactor tube is cooled by introduction of cold inert gas (e.g. H$_2$) and the deposition on the wall is reduced thereby.

US20020081250A1 describes a process in which corroding away or partial corroding of the deposit on the wall in the reactor tube is carried out at operating temperature or close to the operating temperature of the fluidized-bed reactor by means of a halogen-containing gaseous corroding agent such as hydrogen chloride, chlorine gas or silicon tetrachloride.

The disadvantage of all the stated solutions for reducing the deposition of silicon on the reactor tube surface is the increased operating costs. In the case of introduction of HCl/inert gas, the conversion and thus the space-time yield of the reactor decreases because the introduction of HCl/inert gas acts counter to the actual objective of silicon deposition. In addition, hydrogen chloride is generally not available in the same high purity as the other feed gases (hydrogen, chlorosilanes). An additional plant for upgrading to the appropriate quality would thus be necessary for use of hydrogen chloride. In the case of cooling of the wall, the energy consumption of the process increases so significantly that the process becomes uneconomical.

On the other hand, the deposition of silicon on the wall of the reactor tube of a fluidized-bed reactor is not the only negative. Such a reactor tube, made of fused silica for example, has a high purity, but deforms at temperatures above 1150° C. A silicon deposit on the wall having a thickness of more than 1 mm stabilizes the fused silica tube mechanically. In addition, such a wall deposit, which consists of highly pure Si, increases the purity of the granular poly-Si produced.

SUMMARY OF THE INVENTION

It was an object of the invention to provide an economical process for producing granular polycrystalline silicon in a fluidized-bed reactor comprising a reactor tube and a heating device outside the reactor tube. These and other objects are achieved by a process in which silicon nucleus particles (seed) are fluidized in the reactor tube by means of a gas stream in a fluidized bed which is heated by means of a heating device and polycrystalline silicon is deposited by means of pyrolysis on the hot silicon nucleus particles by introduction of a silicon-containing reaction gas into the fluidized bed, and the granular polycrystalline silicon formed in this way is removed from the reactor tube, where the reactor tube has a fluidized bed region and an unheated region above the fluidized bed, and the reactor tube has a silicon coating on its interior wall, characterized in that the unheated region of the reactor tube above the fluidized bed has a wall temperature which results in the silicon coating in the total reactor tube having a maximum silicon layer thickness which has a ratio to the average silicon layer thickness in the fluidized bed region of from 7:1 to 1.5:1 after a period of operation of from 15 to 500 days.

BRIEF DESCRIPTION OF THE DRAWINGS

FIG. 1 shows a fluidized-bed reactor according to the prior art.

FIG. 2 shows, in the left-hand half, the schematic depiction of one embodiment of a fluidized-bed reactor according to the invention, and the silicon layer thickness on the interior wall.

FIG. 3 shows, in the left-hand half, the schematic depiction of one embodiment of a fluidized-bed reactor according to the prior art, and the silicon layer thickness on the interior wall.

DETAILED DESCRIPTION OF THE PREFERRED EMBODIMENTS

The maximum silicon layer thickness in the total reactor tube in accordance with the invention is thus not more than seven times and at least 1.5 times as thick as the average silicon layer thickness in the fluidized bed region of the reactor tube.

The maximum silicon layer thickness in the total reactor tube is preferably not more than 5 times and at least 1.5 times as thick as the average silicon layer thickness in the fluidized bed region of the reactor tube.

The maximum silicon layer thickness in the total reactor tube is more preferably not more than 4 times and at least 1.5 times as thick as the average silicon layer thickness in the fluidized bed region of the reactor tube.

The determination of the maximum silicon layer thickness and the average silicon layer thickness is carried out in the respective deposition process at the same point in time, preferably after a period of operation of from 17 to 150 days, inclusive, more preferably after a period of operation of from 20 to 100 days, inclusive.

The preferred method of determining the silicon layer thickness is to measure the wall deposit in the tube after disassembly of the reactor. Here, the total wall thickness of the reactor tube which has increased by the contribution of the wall deposit is determined. Measurements are preferably carried out at a total of 240 places, namely at 12 equidistant positions over the circumference at in each case 20 equidistant positions over the height. The lowest height at which a measurement is carried out is the height of the introduction of silane. The highest place at which a measurement is carried out is the height which is obtained arithmetically when the reactor contents are assumed to be a fixed bed. Up to this height, a fluidized bed is reliably present in the fluidized state as well.

The maximum height for the wall deposit measurement is thus:

$$h_{measurement,max} = \frac{m_{Si,tot} \cdot 4}{\rho_{bed} \cdot d_{FB}^2 \cdot \pi}$$

h_measurement,max: maximum height coordinate of the wall deposit determination. Reference point: bottom plate of the reactor m_Si,tot: total mass of granular silicon in the reactor ρ_bed: density of granular silicon in the unfluidized state, usually a value in the range 1400-1600 kg/m$^3$ d_FB: diameter of the fluidized bed An arithmetic mean is calculated from the 240 measurement points. This value corresponds to the average silicon layer thickness in the fluidized bed region of the reactor tube.

The layer thickness ratio is controlled by setting a defined axial temperature gradient in the unheated region of the reactor tube above the fluidized bed. The axial temperature gradient of the reactor tube is from 300 K/m to 5000 K/m, preferably from 350 K/m to 4000 K/m, and most preferably from 380 K/m to 2000 K/m.

The axial temperature gradient of the reactor tube is, for example, determined using a plurality of pyrometers, preferably from two to five pyrometers, which are located on the outside of the tube and measure the tube exterior temperature at various vertical positions through a sight glass.

The axial temperature gradient in the unheated region of the reactor tube is preferably achieved by the outside of the reactor tube above the fluidized bed having less insulation than the reactor tube in conventional fluidized-bed reactors. There, the radial distance between reactor tube and the next part which is located on the outside of the reactor tube and encloses the tube over at least 95% of its circumference is preferably from 20 to 1000 mm, more preferably from 30 to 600 mm, and most preferably from 40 to 400 mm.

As a result of this spacing, the reactor tube can be cooled effectively by convection in the region above the fluidized bed. The close-fitting insulation which is otherwise usually present there hinders heat transfer by convection and thermal conduction.

The region above the fluidized bed commences at the surface of the fluidized bed and from there has an axial extension of from 0.15 to 10 m, preferably from 0.2 to 5 m and most preferably from 0.25 to 2 m. Above this distance, there can again be insulation filling the entire cross section of the in-between jacket, or a heat shield.

The wall temperature of the interior wall of the reactor is, owing to the abovementioned axial temperature gradient of the reactor tube above the fluidized bed, lower than the wall temperature in the region of the fluidized bed. Owing to the lower wall temperature, deposition of silicon above the fluidized bed is reduced. If this region is completely insulated, the wall there has approximately the temperature of the fluidized bed and more silicon deposits on the wall there as compared to when this region is less insulated or not insulated. The free space (21 in FIG. 2) formed in this way in the intermediate space between the interior wall of the vessel and the outer wall of the reactor tube in the region above the fluidized bed is preferably cooled convectively by means of inert gas (inlet at 19, outlet at 20 in FIG. 2) and/or by outward thermal radiation and optionally conduction at cooled components.

The process of the invention thus allows targeted coating of the reactor tube with silicon during the steady-state deposition process for producing granular polycrystalline silicon.

A further object of the invention was to provide a reactor for carrying out the process of the invention.

Such a fluidized-bed reactor consists of a vessel into which a reactor tube is inserted. Between the interior wall of the vessel and the outer wall of the reactor tube, there is an intermediate space. This intermediate space contains insulation material, with the insulation material in the intermediate space region which in the reactor tube corresponds to the unheated region above the fluidized bed being arranged in such a way that the reactor tube in the unheated region above the fluidized bed has an axial temperature gradient of from 300 K/m to 5000 K/m during the steady-state deposition process for producing granular polycrystalline silicon.

The reactor tube in the unheated region above the fluidized bed preferably has an axial temperature gradient of from 350 K/m to 4000 K/m, more preferably from 380 K/m to 2000 K/m.

This temperature gradient results in the silicon coating in the total reactor tube having a maximum silicon layer thickness which has a ratio to the average silicon layer thickness in the fluidized bed region of from 7:1 to 1.5:1 after a period of operation of from 15 to 500 days. Preference is given to a ratio of from 5:1 to 1.5:1; particular preference is given to a ratio of from 4:1 to 1.5:1.

In one variant of the reactor according to the invention, the intermediate space between the interior wall of the vessel (1) and the outer wall of the reactor tube (2) is divided by the insulation above the heater into two gas spaces having negligible convective exchange. Both gas spaces are flushed with the inert gas nitrogen or Ar. The upper gas space (corresponds to the free space 21 in FIG. 2) is delimited in the direction of the outer wall of the fluidized-bed reactor by a three-layer radiation shield composed of molybdenum/lanthanum oxide. The radiation shield minimizes heat losses by radiation into the cooled steel shell. The outer wall of the reactor tube is cooled convectively by inert gas, so that the formation of the silicon wall deposit in the interior of the reactor tube is kinetically inhibited in this region. A lower temperature than the fluidized bed temperature prevails at the inside of the reactor tube in this region. The lower gas space (corresponds to the region around the fluidized bed) is constructed and insulated as is known from the prior art (see, for example, FIG. 1, 2 or 3).

In one variant of the invention, the inside of the reactor tube is provided with a tracer layer composed of a material which does not become incorporated into the product but dissolves in or reacts with the reaction gas. Consequently, the tracer can be detected in the reaction by-products without the purity of the product being adversely affected. This can, for example, occur in the offgas by means of process gas chromatography.

The tracer layer can be applied beforehand or as part of the running-in process to the surface to be coated and contains inorganic elements which, in a limited concentration, do not have adverse effects on the product and can be detected in the offgas train, for example silver or calcium. During the course of the steady-state silicon deposition process, a wall deposit composed of silicon is formed on the tracer layer and prevents direct contact of the tracer with the particles. The silicon wall deposit is removed at periodic intervals by means of a corroding gas, for example HCl or SiCl$_4$. In order for a residual deposit of silicon still to remain, the corroding process is stopped as soon as the tracer is detectable in the reaction by-products.

FIG. 1 shows a fluidized-bed reactor according to the prior art. This fluidized-bed reactor comprises
a reactor vessel (1),
a reactor tube (2) for a fluidized bed (4) containing granular polysilicon,
a reactor bottom (15),
one or more bottom gas nozzles (9) in order to feed a fluidizing gas (7) into the reactor tube (2), and
one or more reaction gas nozzles (10) in order to feed a reaction gas mixture (6) into the reactor tube (2),
a reactor top (8) via which seed (12) is introduced by means of a seed feed device (11) into the reactor tube (2),
an offtake conduit (14) at the reactor bottom (15) via which the granular polysilicon product (13) is taken off,
a facility for discharging reactor offgas (16) from the reactor tube (2),
a heating device (5) for heating the fluidized bed (4),
an insulation material (18) in the intermediate space between the interior wall of the vessel (1) and the outer wall of the reactor tube (2),
where radiation shields (17) are optionally present in the intermediate space (3) between the heater (5) and the insulation material (18) and the intermediate space (3) contains an inert gas.

The height of the reaction gas nozzles (10) in the reactor can differ from the height of the bottom gas nozzles (9). A bubble-forming fluidized bed with additional vertical secondary gas injection is formed in the reactor by the arrangement of the nozzles.

The reactor top (8) can have a greater cross section than the fluidized bed.

The radiation shields (17) which are optionally present are located on the side of the heater (5) which faces away from the reactor tube. They are preferably arranged around the heater (5). Particular preference is in each case given to a circular radiation shield being installed above and below the heater (5) and a cylindrical radiation shield being located behind the heater (5). It is also possible to connect the upper radiation shield and the cylindrical radiation shield or the lower radiation shield and the cylindrical radiation shield to one another.

A reactor according to the invention differs from this reactor in that the insulation material (18) in the free space (21), which corresponds in the reactor tube (2) to the region above the fluidized bed (4), is reduced to such an extent that in the reactor tube (2) a silicon coating is formed in which the maximum silicon layer thickness in the total reactor tube has a ratio to the average silicon layer thickness in the fluidized bed region of from 7:1 to 1.5:1 after a period of operation of from 15 to 500 days.

The maximum silicon layer thickness in the total reactor tube is preferably not more than 5 times and at least 1.5 times as thick as the average silicon layer thickness in the fluidized bed region of the reactor tube.

The maximum silicon layer thickness in the total reactor tube is particularly preferably not more than 4 times and at least 1.5 times as thick as the average silicon layer thickness in the fluidized bed region of the reactor tube.

Particular preference is given to the insulation material being arranged in the intermediate space region (21), which corresponds to the region above the fluidized bed in the reactor tube, in such a way that the axial temperature gradient of the reactor tube there is from 300 K/m to 5000 K/m, preferably from 350 K/m to 4000 K/m, and more preferably from 380 K/m to 2000 K/m.

On the outside of the reactor tube wall above the fluidized bed, the radial distance between reactor tube and the next part which is located on the outside of the reactor tube and encloses the tube over at least 95% of its circumference is preferably from 20 to 1000 mm, more preferably from 30 to 600 mm, and most preferably from 40 to 400 mm.

FIG. 2 shows, in the left-hand half, the schematic depiction of a fluidized-bed reactor according to the invention as described above and used in example 1 and also, in the coordinate system at right next to the image, the silicon layer thickness s on the interior wall of the reactor tube at the height of the respective region which can be seen in the image at left (z: height coordinate).

FIG. 3 shows, in the left-hand half, the schematic depiction of a fluidized-bed reactor according to the prior art as used in the comparative example and also, in the coordinate system at right next to the image, the silicon layer thickness on the interior wall of the reactor tube at the height of the respective region which can be seen in the image at left.

The following examples serve to illustrate the invention:

Example 1

In a fluidized-bed reactor, high-purity granular polysilicon is deposited from trichlorosilane. Hydrogen is used as fluidizing gas. The deposition takes place at a pressure of 3 bar (abs) and a fluidized bed temperature of 1200° C. in a reactor tube having an internal diameter of 500 mm. Product is continuously taken off and the introduction of seed is regulated so that the Sauter diameter of the product is 1000±50 μm. The intermediate jacket is flushed with nitrogen. The residence time of the reaction gas in the fluidized bed is 0.5 s.

A total of 800 kg/h of gas are fed in, with 17.5 mol % thereof consisting of trichlorosilane and the remainder consisting of hydrogen.

The reactor tube consists of fused silica. In the steady-state deposition process, a temperature of approximately 1200° C. is established on the outer wall of the tube in the heated reaction zone. At such temperatures, fused silica becomes soft in the long term, so that the reactor tube would deform and no longer be sealed from the intermediate jacket. For this reason, a supporting and at the same time highly pure layer of silicon is applied in a targeted manner to the interior wall of the reactor tube in the steady-state deposition process.

The reactor tube temperature in the fluidized bed region is virtually constant over the height as a result of the high heat transfer coefficient between wall and fluidized bed (usually 500-1500 W/m²K) and the good mixing within the fluidized bed. A temperature of 1290° C. prevails at the inside of the reactor tube in the fluidized bed region.

The interior wall of the reactor tube in the fluidized bed region has a very small surface area compared to the granular material, for which reason the growth rate of the silicon wall deposit there is merely 6.5 µm/h. The heating device is unsegmented. It is surrounded on the outside, at the bottom and at the top by insulation. The intermediate space between the interior wall of the vessel and the outer wall of the reactor tube (2) is divided by the insulation into two regions which have negligible convective gas exchange and have a separate inert gas inlet and outlet.

In the upper region (corresponds to free space 21 in FIG. 2), a three-layer radiation shield which is composed of molybdenum/lanthanum oxide and minimizes heat losses by radiation into the cooled steel shell is firstly located on the inside of the interior wall of the vessel. The outer wall of the reactor tube is cooled convectively by means of inert gas, so that the formation of the silicon wall deposit is kinetically inhibited in the interior of the reactor tube in this region. For this reason, a temperature lower than the fluidized bed temperature prevails on the inside of the reactor tube in this region.

Above the less insulated region of the intermediate space above the fluidized bed, excessive cooling of the reaction gas should, however, be prevented, for which reason insulation preferably again adjoins the outside of the tube there. At the transition point, the reaction gas has a temperature which is 210° C. lower than that of the fluidized bed.

The ratio of maximum silicon layer thickness in the total reactor tube to the average silicon layer thickness in the fluidized bed region after 25 days is 3.55:1.

Comparative Example

The process of example 1 is carried out in a conventional fluidized-bed reactor. Such a reactor is depicted in FIG. 3.

Above the fluidized bed, a silicon wall deposit is formed significantly more quickly on the interior surface of the tube above the fluidized bed than in the fluidized bed. In this region, a temperature which is approximately equal to the fluidized bed temperature prevails because of the continuous insulation of the in-between jacket. After deposition has been carried out for 25 days, a major part of the reactor cross section has already grown shut.

The ratio of maximum silicon layer thickness in the total reactor tube to the average silicon layer thickness in the fluidized bed region after 25 days is 35:1.

The pressure drop over this position increases with the thickness of the wall deposit. A high admission pressure is desirable in the offgas purification; in addition, the tube would grow shut during further operation.

The invention claimed is:

1. In a process for producing granular polycrystalline silicon in a fluidized-bed reactor comprising a reactor tube and a heater outside the reactor tube, in which silicon nucleus particles (seed) are fluidized in the reactor tube by a gas stream in a fluidized bed which is heated by heater, and polycrystalline silicon is deposited by pyrolysis on the hot silicon nucleus particles by introduction of a silicon-containing reaction gas into the fluidized bed and granular polycrystalline silicon formed in this way is removed from the reactor tube, where the reactor tube has a fluidized bed region and an unheated region above the fluidized bed, an intermediate space between an interior wall of a vessel and an outer wall of the reactor tube containing an insulation material and the reactor tube has a silicon coating on its interior wall, the improvement comprising:

reducing the deposition of silicon on an interior of the unheated region of the reactor tube above the fluidized bed by establishing a wall temperature of the unheated region of the reactor tube which is lower than the wall temperature of the reactor tube in the region of the fluidized bed, where, owing to the lower wall temperature, the deposition of silicon above the fluidized bed is reduced, and setting a defined axial temperature gradient in the reactor tube in the region above the fluidized bed of from 300 K/m to 5000 K/m, whereby the silicon coating in the total reactor tube has a maximum silicon layer thickness which has a ratio to the average silicon layer thickness in the fluidized bed region of from 7:1 to 1.5:1 after a period of operation of from 15 to 500 days, wherein the axial temperature gradient is achieved by employing the fluidized bed reactor comprising:

the vessel having the interior wall into which the reactor tube having the outer wall is inserted, the reactor having the intermediate space between the interior wall of the vessel and the outer wall of the reactor tube, the intermediate space containing the insulation material, wherein the insulation material in the intermediate space in the reactor tube in the region of the unheated region above the fluidized bed is arranged such that the outside of the reactor tube above the fluidized bed is not insulated to the same degree as the region of the reactor tube adjoining the fluidized bed within the reactor tube.

2. The process of claim 1, wherein the maximum silicon layer thickness in the total reactor tube is not more than 5 times and at least 1.5 times as thick as the maximum silicon layer thickness in the fluidized bed region of the reactor tube.

3. The process of claim 1, wherein the maximum silicon layer thickness in the total reactor tube is not more than 4 times and at least 1.5 times as thick as the maximum silicon layer thickness in the fluidized bed region of the reactor tube.

4. The process of claim 1, further comprising a radial distance between reactor tube and a next part of the reactor which is located on the outside of the reactor tube and encloses the tube over at least 95% of its circumference is from 20 to 1000 mm.

* * * * *